United States Patent
De Pape et al.

(10) Patent No.: US 8,821,045 B1
(45) Date of Patent: Sep. 2, 2014

(54) CAMERA MOUNT

(71) Applicant: Target Brands, Inc., Minneapolis, MN (US)

(72) Inventors: Neal B. De Pape, Minnetonka, MN (US); Jason David Reasoner, Minneapolis, MN (US); Samuel Silva, Robbinsdale, MN (US); Matthew Dennis Hainley, Vadnais Heights, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/693,681

(22) Filed: Dec. 4, 2012

(51) Int. Cl.
G03B 17/00 (2006.01)
G03B 17/56 (2006.01)

(52) U.S. Cl.
CPC .................... *G03B 17/561* (2013.01)
USPC .......................................... 396/427; 348/143

(58) Field of Classification Search
CPC ...... G03B 17/00; G03B 17/56; G03B 17/561; G03B 17/568
USPC .......................................... 396/427; 348/143
See application file for complete search history.

(56) References Cited

U.S. PATENT DOCUMENTS

| | | |
|---|---|---|
| 2,537,863 A | 1/1951 | Sato |
| 2,650,056 A | 8/1953 | Masoner |
| 2,949,798 A | 8/1960 | Berta, Jr. |
| 3,022,030 A | 2/1962 | Geer |
| 3,355,133 A | 11/1967 | Barchfeld |
| D340,940 S | 11/1993 | Ellenberger et al. |
| 5,813,175 A | 9/1998 | Hiragaki |
| 5,934,631 A | 8/1999 | Becker et al. |
| 6,484,979 B1 | 11/2002 | Medlin, Jr. |
| 6,523,321 B1 | 2/2003 | Leek et al. |
| 7,789,574 B2 | 9/2010 | Broberg |
| 7,848,635 B2 | 12/2010 | Routhier |
| 7,883,065 B2 | 2/2011 | Nelson |
| 8,109,680 B2 | 2/2012 | Olien |
| 8,404,971 B1 * | 3/2013 | Gretz ............................. 174/50 |
| 2001/0055486 A1 | 12/2001 | Visram |
| 2001/0055487 A1 | 12/2001 | Akada |
| 2004/0049933 A1 | 3/2004 | Hicks |
| 2006/0016947 A1 | 1/2006 | Capozzi et al. |
| 2006/0175594 A1 * | 8/2006 | Burkart et al. ............. 256/65.02 |
| 2008/0107413 A1 | 5/2008 | Moore et al. |
| 2008/0236887 A1 | 10/2008 | Bakst et al. |
| 2008/0296460 A1 | 12/2008 | Kerr, Jr. |
| 2010/0014849 A1 | 1/2010 | Mota et al. |
| 2010/0239241 A1 | 9/2010 | Chou |
| 2013/0085632 A1 * | 4/2013 | De Laurentis et al. ......... 701/22 |
| 2013/0101277 A1 * | 4/2013 | Barreiro .......................... 396/55 |

* cited by examiner

*Primary Examiner* — Clayton E LaBalle
*Assistant Examiner* — Fang-Chi Chang
(74) *Attorney, Agent, or Firm* — Nixon & Vanderhye P.C.

(57) ABSTRACT

A system includes a beam bracket, a small camera bracket, and a large camera bracket. The beam bracket is adapted to be mounted to a building structure and has mounting holes distributed in a spatial configuration. The small camera bracket has mounting holes distributed in the same spatial configuration as the beam bracket with the mounting holes of the small camera bracket adapted to be aligned with the mounting holes of the beam bracket. The small camera bracket further includes a plate adapted to support a small camera. The large camera bracket has mounting holes distributed in the same spatial configuration as the beam bracket and adapted to be aligned with the mounting holes of the beam bracket. The large camera bracket further includes a plate adapted to support a large camera that is larger than the small camera.

19 Claims, 19 Drawing Sheets

CAMERA MOUNT

BACKGROUND

In many settings, security cameras are mounted to building structures such as walls and ceilings. In large retail stores and warehouses, different sized cameras may be used in different locations within a single structure. Many security cameras include electric motors that allow the camera to pan and tilt so as to change the view of the camera and any obstructions near the camera will reduce the total field of view of the camera. Installers of the mounting hardware for these cameras typically have limited knowledge about the cameras and specifically do not have knowledge of the desired fields of view for the cameras.

The discussion above is merely provided for general background information and is not intended to be used as an aid in determining the scope of the claimed subject matter. The claimed subject matter is not limited to implementations that solve any or all disadvantages noted in the background.

SUMMARY

A system includes a beam bracket, a small camera bracket, and a large camera bracket. The beam bracket is adapted to be mounted to a building structure through bracket mounting holes and has camera mounting holes distributed in a spatial configuration. The small camera bracket has mounting holes distributed in the same spatial configuration as the camera mounting holes on the beam bracket with the mounting holes of the small camera bracket adapted to be aligned with the camera mounting holes of the beam bracket. The small camera bracket further includes a plate adapted to support a small camera. The large camera bracket has mounting holes distributed in the same spatial configuration as the camera mounting holes on the beam bracket and adapted to be aligned with the camera mounting holes of the beam bracket. The large camera bracket further includes a plate adapted to support a large camera that is larger than the small camera.

A camera mounting apparatus includes a beam mount and a camera mount. The beam mount has a top surface adapted to be mounted flush against a bottom of a structural beam, a back surface adapted to be mounted flush against a side of the structural beam and a plurality of mounting holes. The camera mount has a plurality of mounting holes such that there is only one orientation of the camera mount relative to the beam mount that will align the plurality of mounting holes of the camera mount with the plurality of mounting holes of the beam mount. The camera mount also has camera mounting holes adapted to allow a camera to be mounted to the camera mount.

A method includes mounting a beam bracket to a building structure such that a bottom ledge of the beam bracket is in contact with a bottom of the building structure and a mounting surface of the beam bracket is in contact with a side surface of the building structure. A selection is made between a small camera bracket and a large camera bracket based on a camera to be mounted to the building structure. The small camera bracket and the large camera bracket both having mounting openings that have the same spatial distribution as mounting openings on the beam bracket. The selected camera mount is mounted to the beam bracket by passing fasteners through the mounting openings of the selected camera mount and the mounting openings of the beam bracket. A camera is then mounted to the selected camera mount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A camera mount system is provided that allows different sized cameras to be mounted to a beam using a same beam bracket and two alternative camera brackets. The beam bracket and the alternative camera brackets are designed so that the camera brackets cannot be mounted upside down on the beam bracket. One of the camera brackets allows a camera to be mounted in two different orientations and still provide access to the electronics connection area on the camera.

In the discussion below, the building structure that the mounting system is mounted to is shown as a solid beam such as a concrete or wooden beam that spans over an area to be monitored using the camera. In other embodiments, the building structure is a vertically-oriented support column or pillar or a corner of a building structure where two walls come together or where a wall and a roof come together. Further, in some embodiments, the building structure that the mounting system is mounted to is not solid but instead is hollow.

Figure 1:
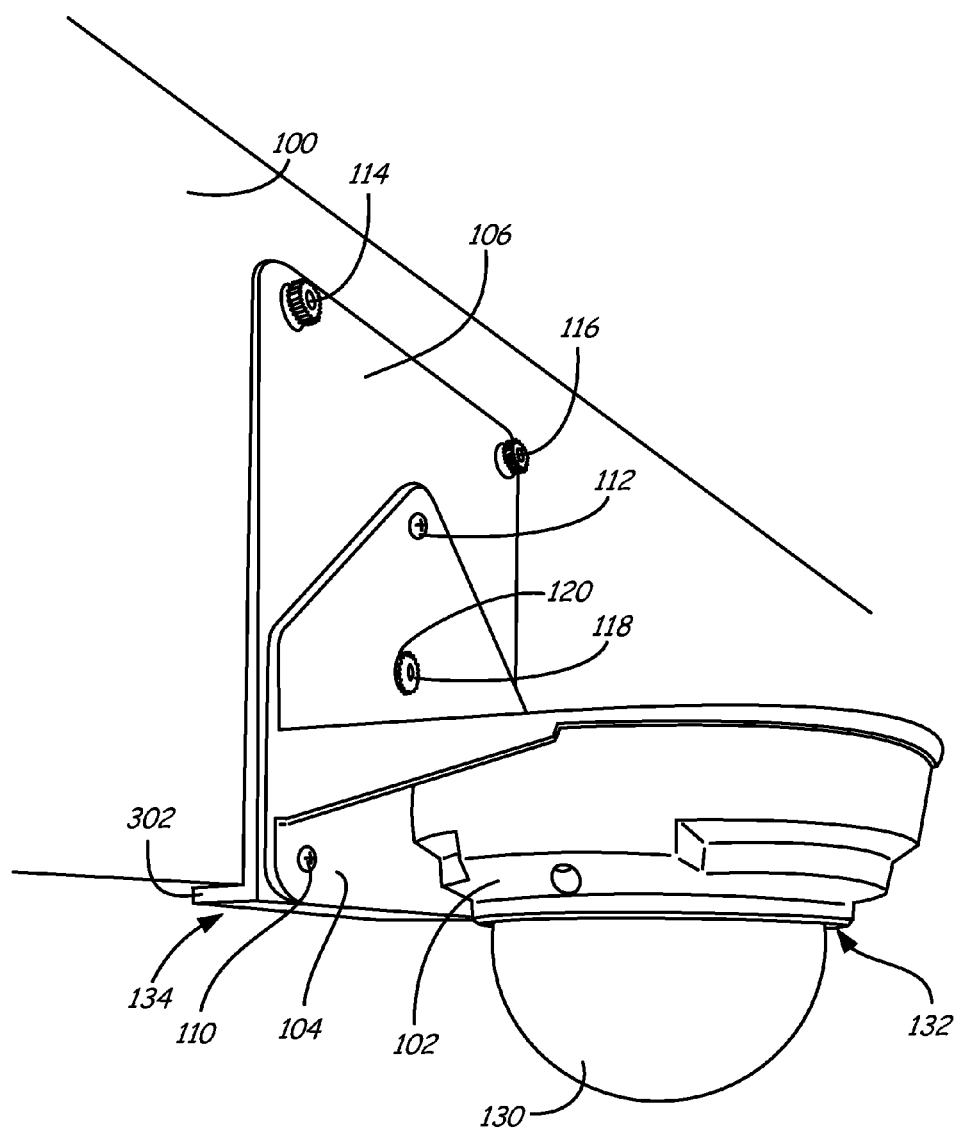
FIG. 1 is a perspective view of a small camera mounted to a beam using a small camera mount.
Figure 2:
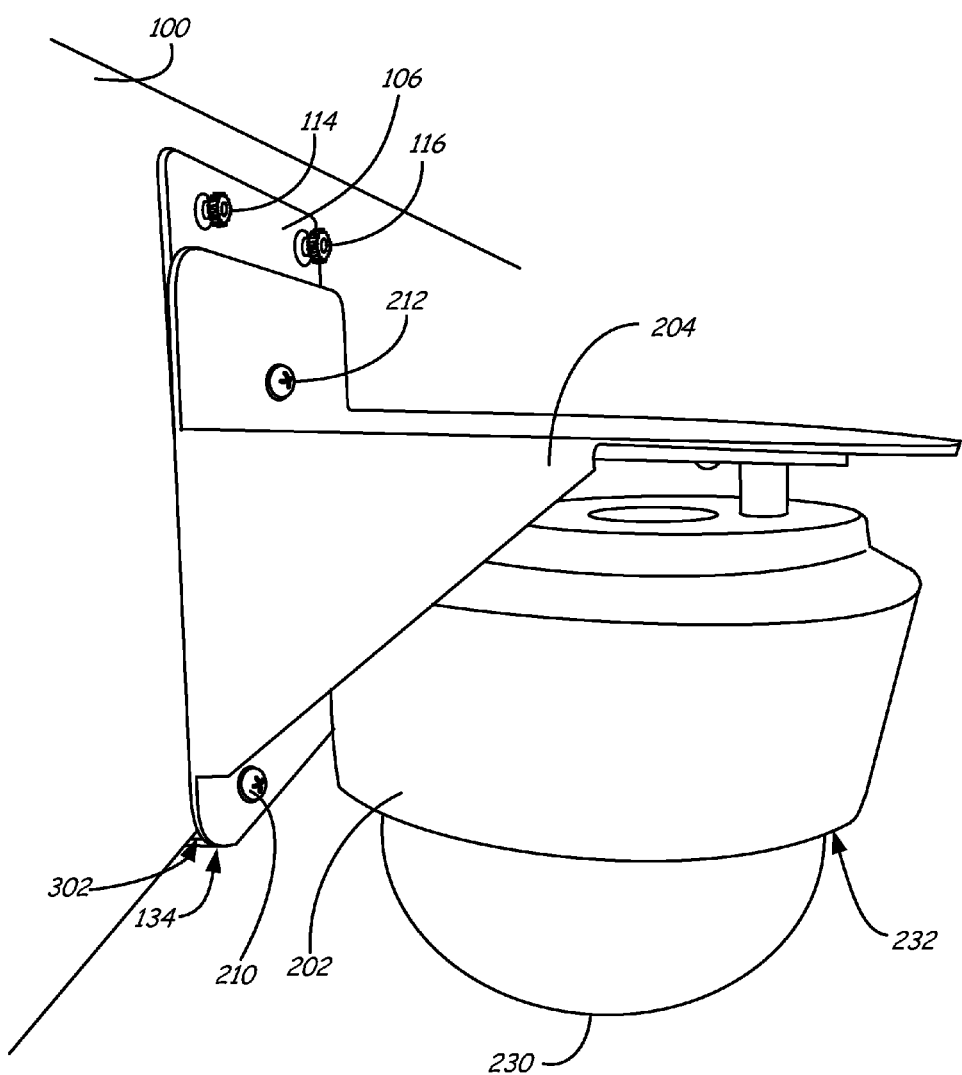
FIG. 2 is a perspective view of a large camera mounted to a beam using a large camera mount.

FIGS. 1 and 2 provide perspective views of a small camera 102 and a large camera 202, respectively, mounted to a building structure 100 using a mounting system described herein. In FIG. 1, small camera 102 is mounted to a small camera bracket or mount 104, which is mounted to a beam bracket or mount 106. Beam bracket 106 is mounted to building structure 100. In the embodiment of FIG. 1, small camera bracket 104 is mounted to beam bracket 106 by screws such as screws 110 and 112. Beam bracket 106 is mounted to building structure 100 by fasteners 114, 116 and 118. An opening 120 in small camera bracket 104 provides a space for fastener 118 so that fastener 118 does not interfere with the mounting of camera bracket 104 to beam bracket 106.

In FIG. 2, large camera 202 is mounted to large camera bracket or mount 204, which is mounted to beam bracket 106. Beam bracket 106 is mounted to building structure 100. In the embodiment of FIG. 2, large camera bracket 204 is mounted to beam bracket 106 by screws such as screws 210 and 212 and beam bracket 106 is mounted to building structure 100 with fasteners 114, 116 and 118 (not visible).

As shown in FIGS. 1 and 2, beam bracket 106 and camera brackets 104 and 204 cooperate to ensure that their respective camera is positioned below building structure 100 so that the view of the camera is not obstructed by building structure 100. In particular, a horizontal section or bottom ledge 302 (also referred to as an extending element) of beam bracket 106 extends beneath building structure 100 to ensure that beam bracket 106, camera brackets 104 and 204 and cameras 102 and 202 are not mounted too high on building structure 100. For instance, in FIG. 1, a dome 130, which houses a rotatable camera lens, has a top 132 that is aligned with a bottom 134 of horizontal section 302. Since horizontal section 302 extends below the bottom surface of building structure 100, the alignment of dome top 132 with the bottom 134 of horizontal section 302 ensures that the entirety of dome 130 and the housed camera lens is below building structure 100. As such, the view of the camera is not obstructed by building structure 100. Similarly, camera 202 includes a camera dome 230 with a top 232 that is aligned with bottom 134 of horizontal section 302 such that a camera lens that is housed in camera dome 230 is below building structure 100.

Figure 3:
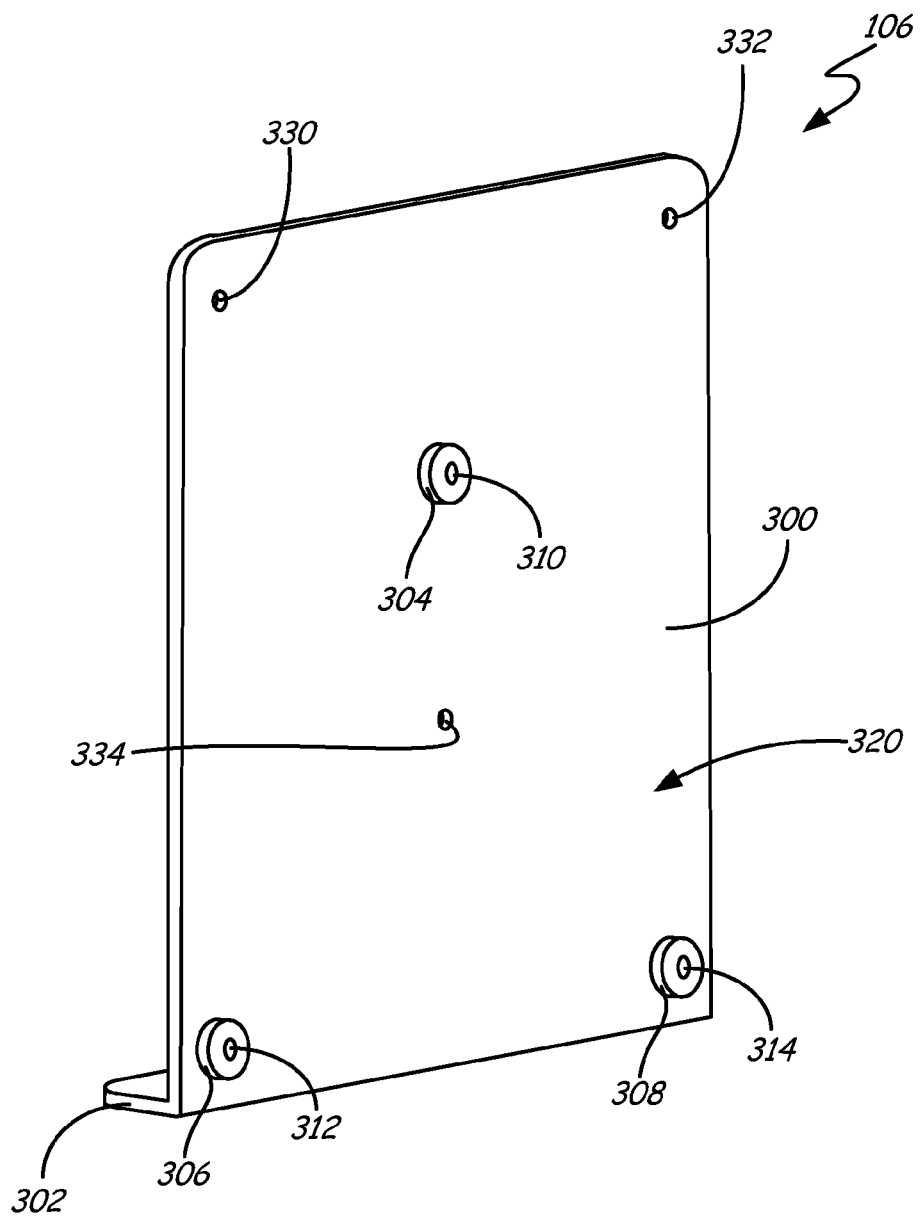
FIG. 3 is a perspective view of a beam mount.
Figure 4:
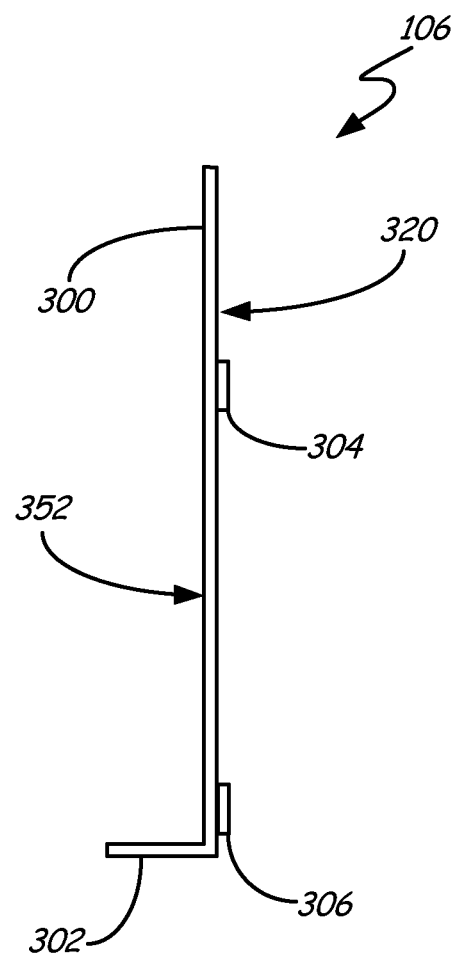
FIG. 4 is a side view of the beam mount of FIG. 3.
Figure 5:
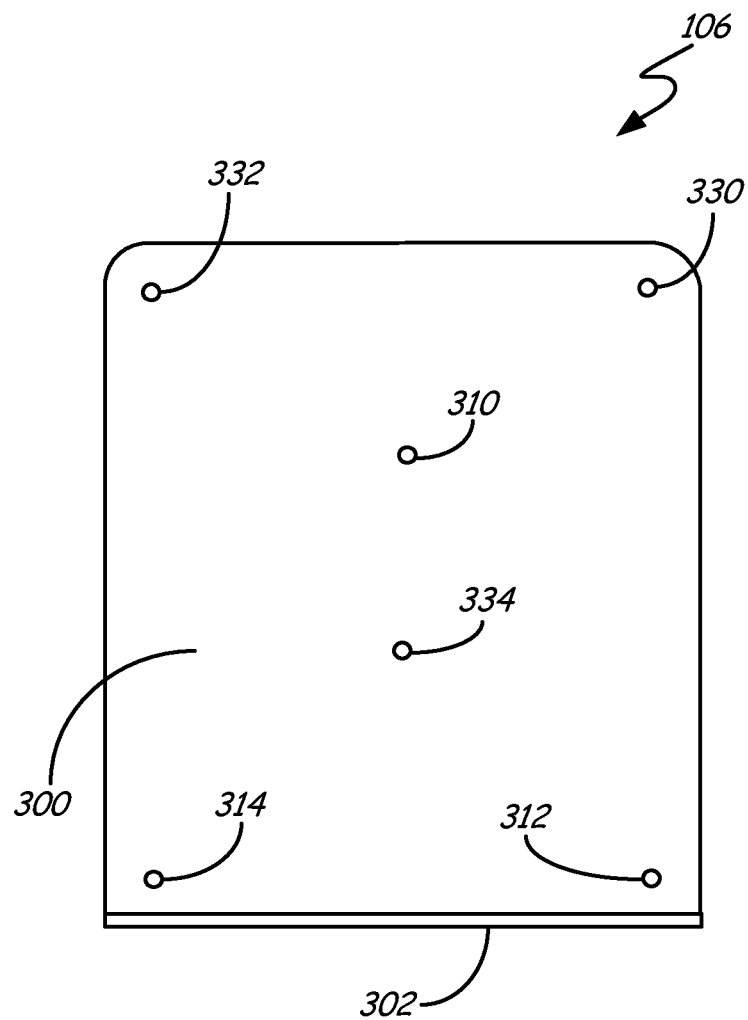
FIG. 5 is a back view of the beam mount of FIG. 3.

FIGS. 3, 4 and 5 provide a perspective view, a side view and a back view, respectively, of beam bracket 106. Beam bracket 106 includes a vertical section or plate 300 and horizontal section or bottom ledge 302. Vertical section 300 includes three spacers 304, 306 and 308 which surround three respective mounting holes 310, 312 and 314 and protrude from front planar surface 320 of vertical section 300. Mounting holes 310, 312 and 314 are used to mount small camera bracket 104 or in the alternative, large camera bracket 204 to beam bracket 106. Spacers 304, 306 and 308 separate front planer surface 320 of vertical portion 300 from a back planer surface of small camera bracket 104 or in the alternative a back planer surface of large camera bracket 204. Vertical section 300 also includes a back planar surface 352 (also referred to as a mounting surface).

Beam bracket 106 also includes mounting holes 330, 332 and 334, which are used to mount beam bracket 106 to building structure 100. In particular, fasteners such as fasteners 114, 116 and 118 are passed through mounting holes 330, 332 and 334 to mount beam bracket 106 to building structure 100.

Mounting holes 310, 312 and 314 have a spatial distribution or configuration that prevents small camera bracket 104 or in the alternative large camera bracket 204 from being mounted in an incorrect orientation on beam 106. In particular, the spatial distribution or configuration shown is a triangular configuration such that the small camera mount and the large camera mount cannot be inverted or turned upside down when installed. Although a triangular distribution is shown, other distributions that use more than three holes may also be used if the distribution prevents the small camera mount and the large camera mount from being inverted or turned upside down when installed.

Beam bracket 106 may be made of a metallic material such as steel or aluminum or may be made of sufficiently strong and rigid plastic.

FIGS. 6, 7, 8 and 9 provide a perspective view, a top view, a side view and a front view, respectively, of small camera bracket 104. Small camera bracket 104 includes a vertical plate 600, a horizontal plate 602 and struts 604 and 606, which extend from a bottom surface 610 of horizontal plate 602 and which extend from a front surface 612 of vertical plate 600. Struts 604 and 606 provide vertical support for horizontal plate 602.

Although struts 604 and 606 are shown as being positioned below horizontal plate 602, those skilled in the art will recognize that struts 604 and 606 could alternatively be placed above horizontal plate 602 to connect a top surface of horizontal plate 602 to front surface 612 of vertical plate 602.

Figure 6:
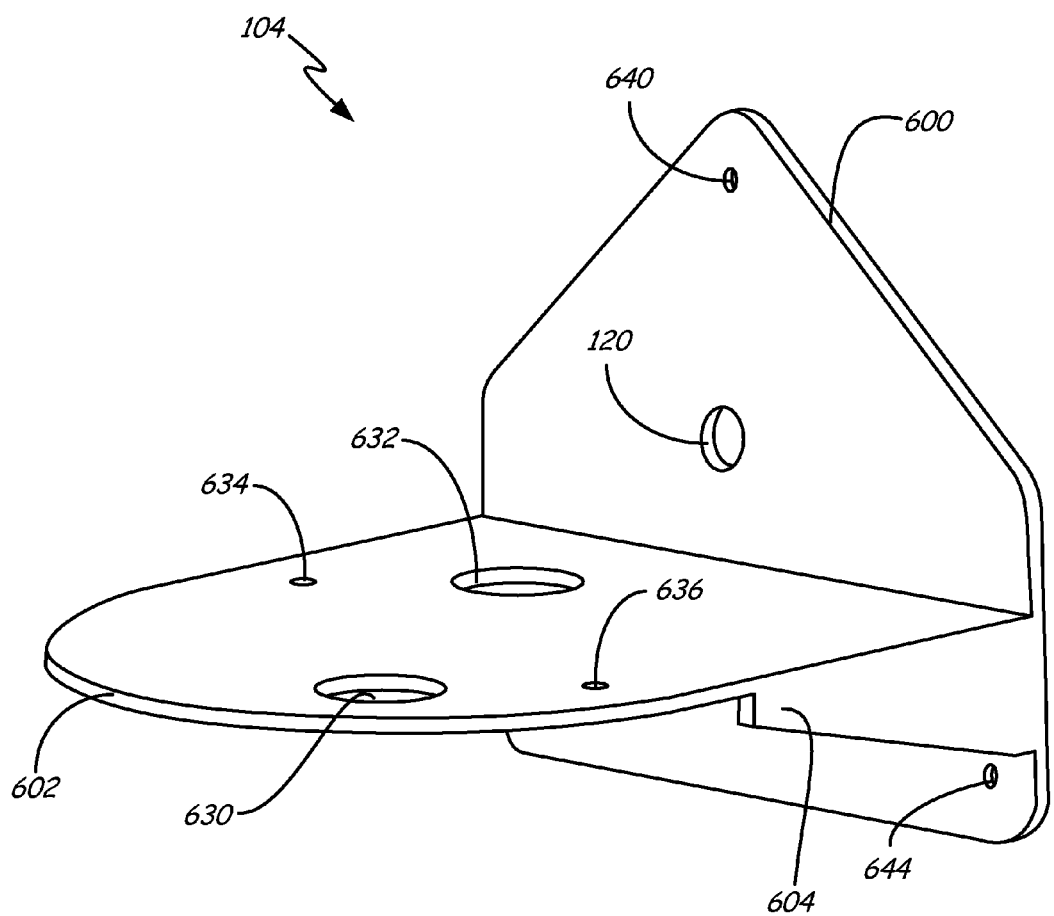
FIG. 6 is a perspective view of a small camera mount.
Figure 7:
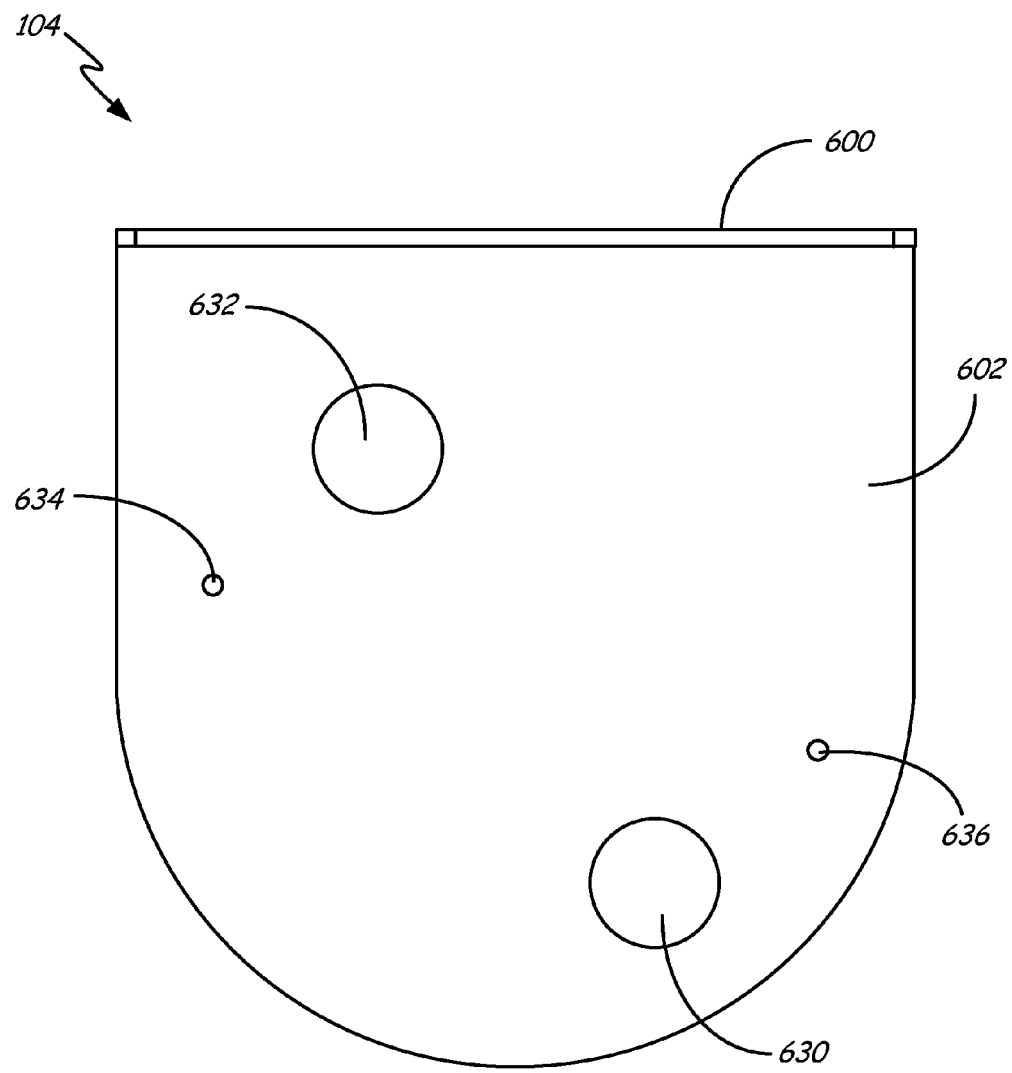
FIG. 7 is a top view of a small camera mount of FIG. 6.
Figure 8:
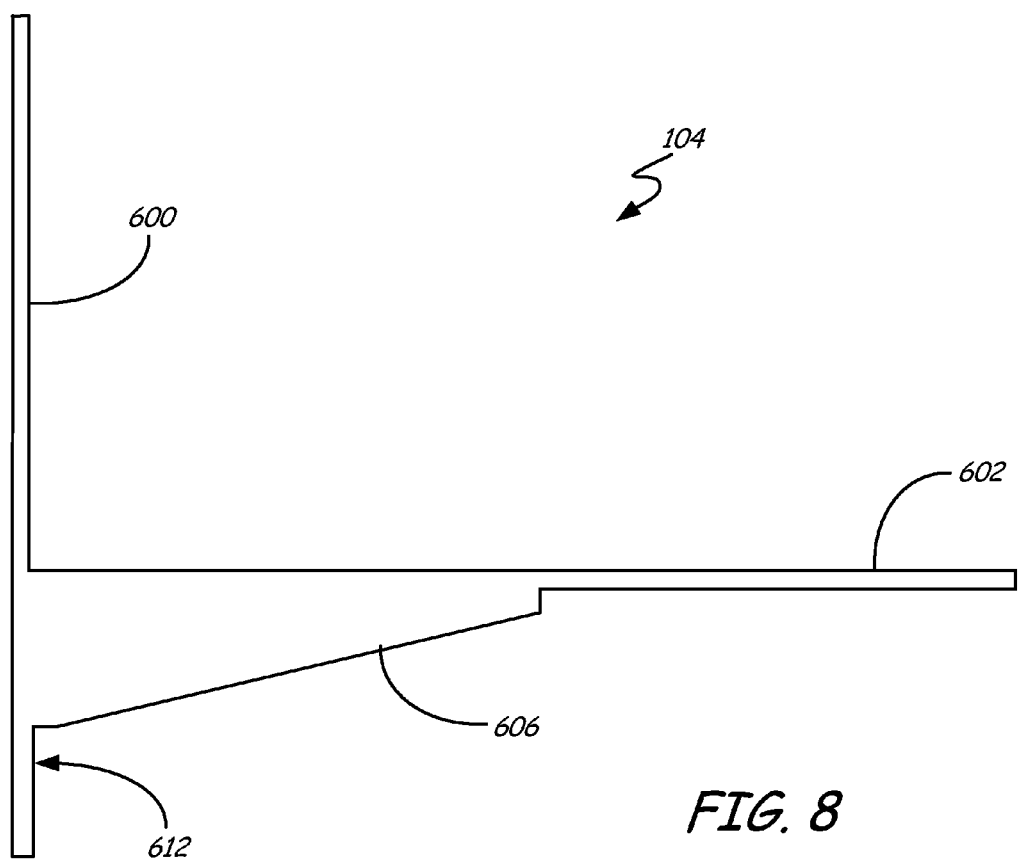
FIG. 8 is a side view of the small camera mount of FIG. 6.

Horizontal plate 602 is adapted to support a small camera. As shown in FIGS. 6 and 7, horizontal plate 602 includes two access holes 630 and 632 and two mounting holes 634 and 636. Mounting holes 634 and 636 allow a small camera to be mounted to small camera bracket 104. Access holes 630 and 632 are alternatively referred to as access openings or electronics openings. While there are only two access holes and two mounting holes shown in FIGS. 6 and 7, those skilled in the art will recognize that additional mounting holes and additional access holes may be provided in horizontal plate 602.

Figure 9:
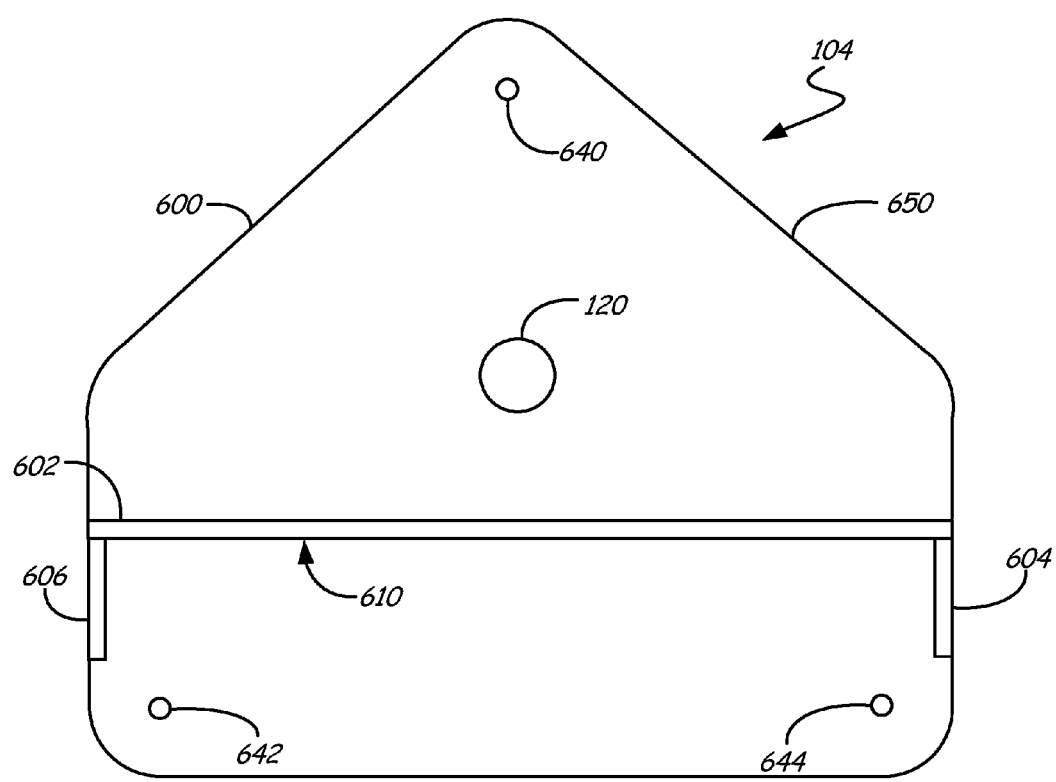
FIG. 9 is a front view of the small camera mount of FIG. 6.
Figure 10:
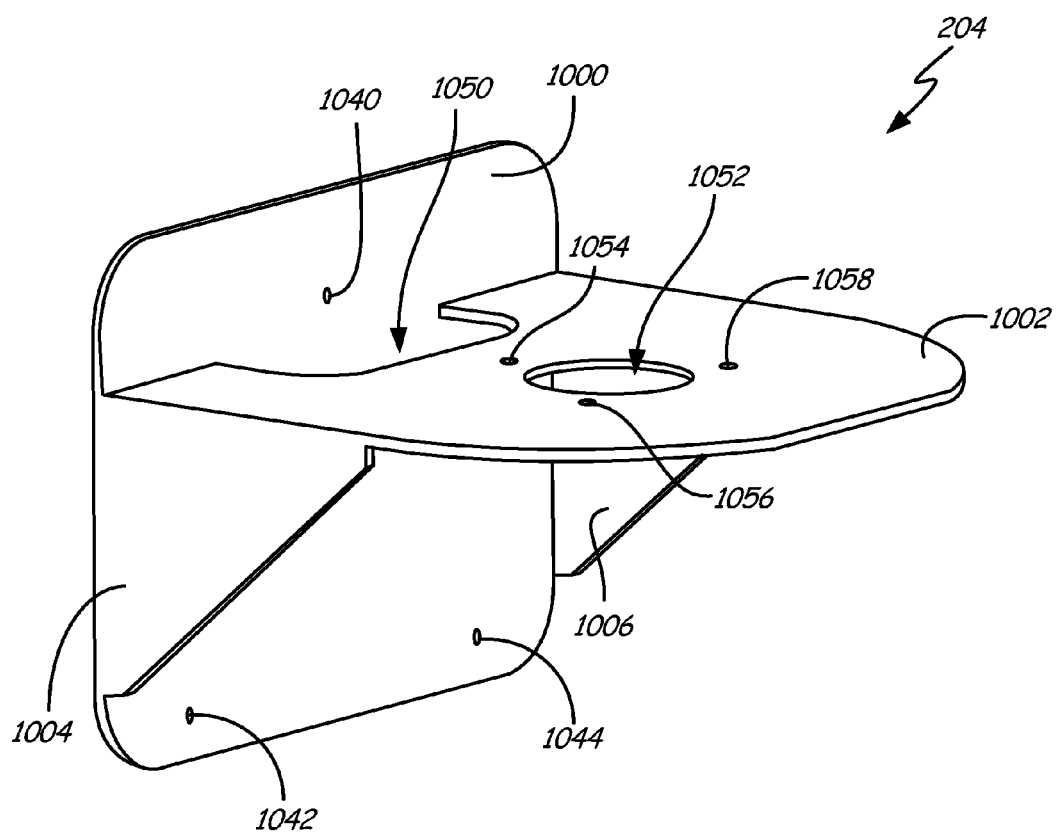
FIG. 10 is a perspective view of a large camera mount.
Figure 11:
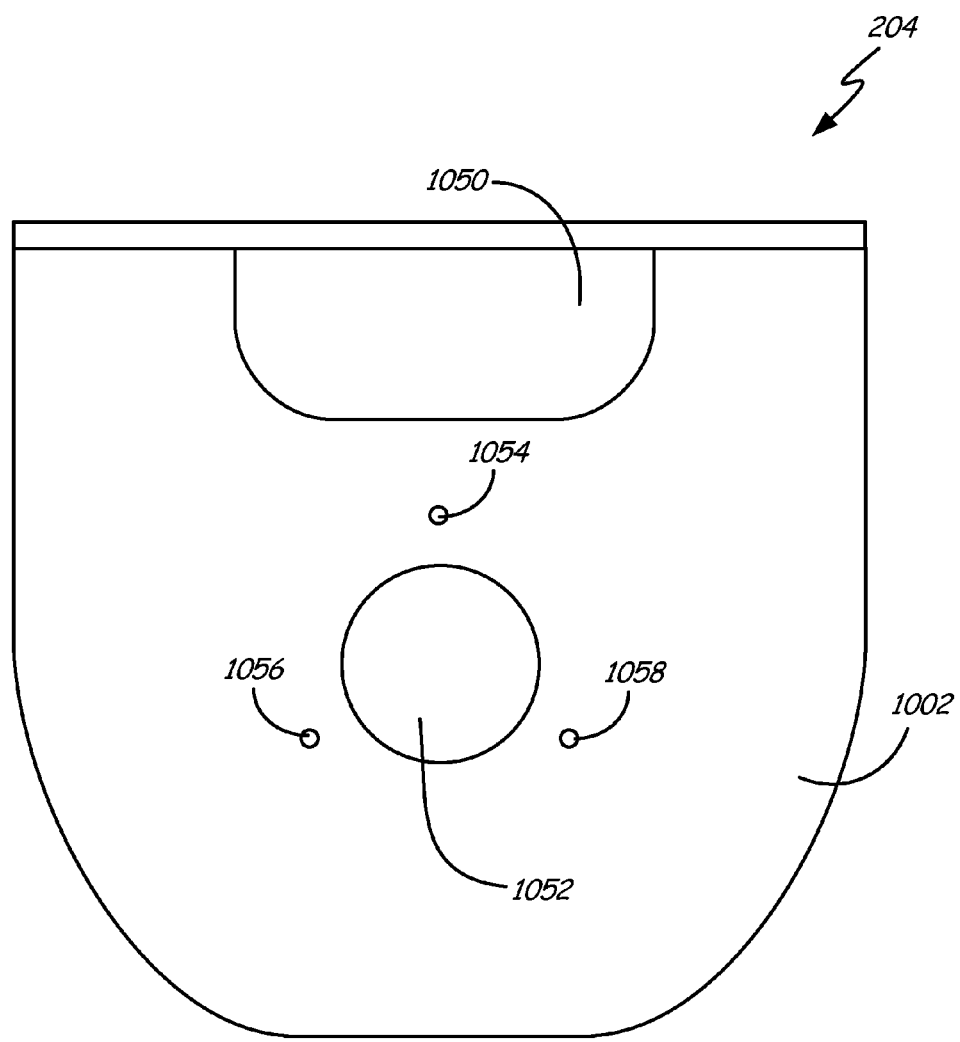
FIG. 11 is a top view of the large camera mount of FIG. 10.
Figure 12:
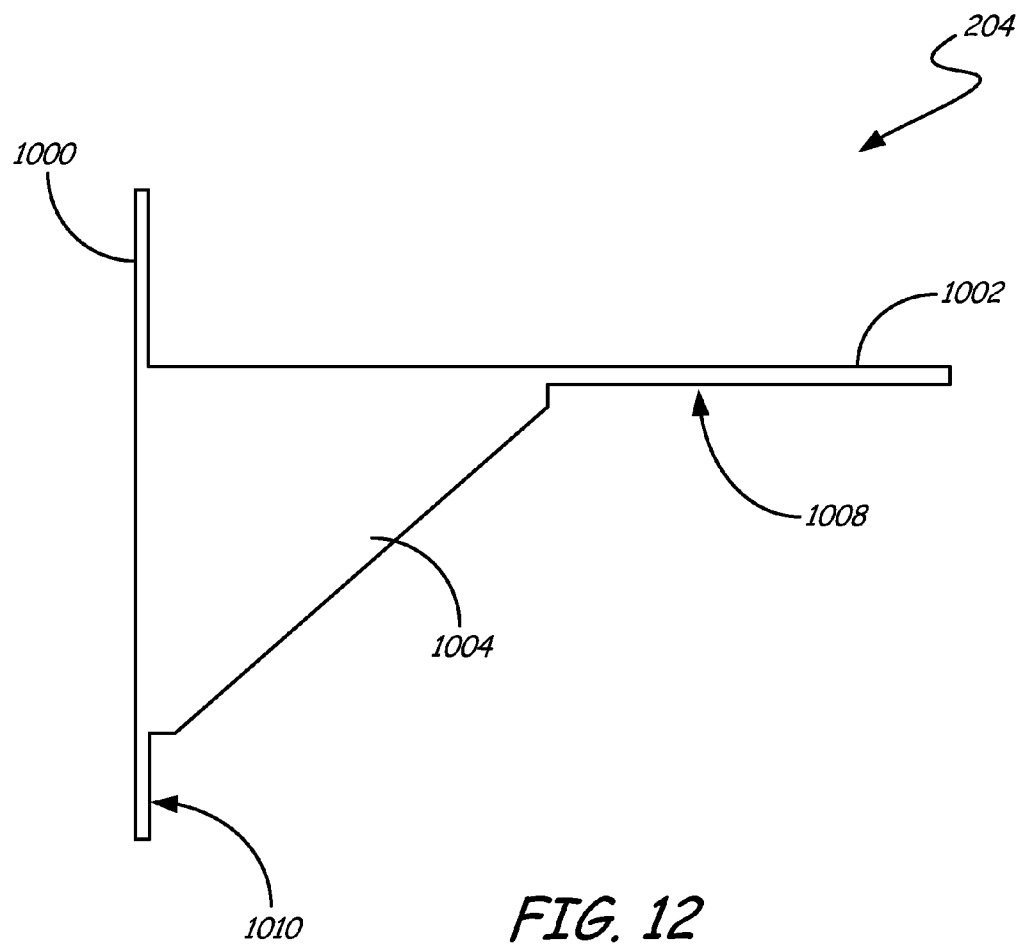
FIG. 12 is a side view of the large camera mount of FIG. 10.
Figure 13:
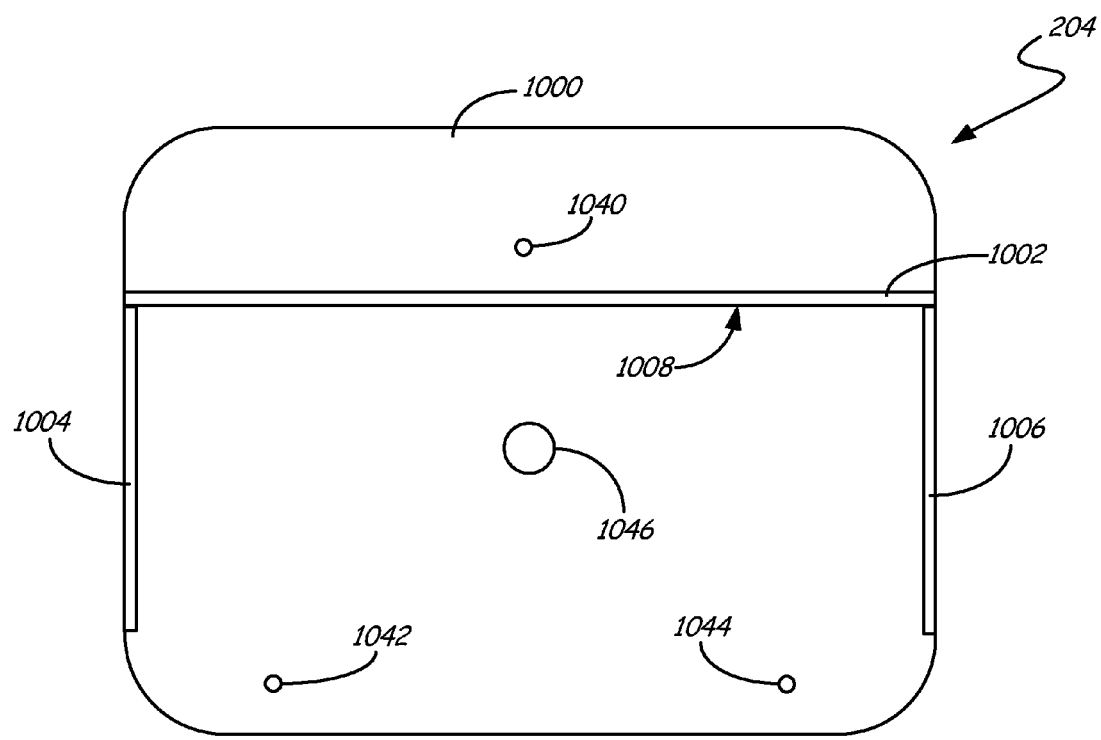
FIG. 13 is a front view of the large camera mount of FIG. 10.

As shown in FIG. 9, vertical plate 600 includes three mounting holes 640, 642 and 644. Mounting holes 640, 642 and 644 have a same spatial distribution or configuration as mounting holes 310, 312 and 314 of beam bracket 106 as shown in FIG. 3. Thus, mounting holes 640, 642 and 644 may be aligned with respective mounting holes 310, 312 and 314. Further, if small camera bracket 104 is inverted, mounting holes 640, 642 and 644 will not align with mounting holes 310, 312 and 314. As such, the spatial distribution of the mounting holes on beam bracket 106 and small camera bracket 104 helps to prevent small camera bracket 104 from being installed upside down on beam bracket 106.

Small camera bracket 104 may be made of any sufficiently rigid and strong material including plastics such as high-density polyethylene, low-density polyethylene, polyvinyl chloride, and polypropylene and metals such as steel. When formed of plastic, small camera bracket 104 may be molded as a single piece. When formed of steel, small camera bracket 104 may be formed of a single piece or formed of multiple pieces that are bent and/or welded together to form the final structure.

As shown in FIG. 9, small camera bracket 104 has a triangular top 650 that reduces the amount of material needed to form small camera bracket 104 as compared to a square top for mounting plate 600.

FIGS. 10, 11, 12 and 13 provide a perspective view, a top view, a side view and a front view, respectively of large camera bracket 204. Large camera bracket 204 includes a vertical plate 1000, a horizontal plate 1002 and struts 1004 and 1006 extending from a bottom surface 1008 of horizontal plate 1002 to a front surface 1010 of vertical plate 1000. Struts 1004 and 1006 provide vertical support to horizontal plate 1002.

Although struts 1004 and 1006 are shown as being positioned below horizontal plate 1002, those skilled in the art will recognize that struts 1004 and 1006 could alternatively be placed above horizontal plate 1002 to connect a top surface of horizontal plate 1002 to a front surface 1010 of vertical plate 1000.

Vertical plate 1000 includes three mounting holes 1040, 1042 and 1044 that have a same spatial distribution or configuration as mounting holes 310, 312 and 314 of beam bracket 106 as well as the same spatial distribution or configuration as mounting holes 640, 642 and 644 of small camera bracket 104. Because their spatial distribution matches the spatial distribution of the mounting holes of beam bracket 106, mounting holes 1040, 1042 and 1044 may be aligned with mounting holes 310, 312 and 314 to mount large camera bracket 204 to beam bracket 106. Further, because of the spatial distribution of the mounting holes, large camera bracket 204 is prevented from being mounted upside down on beam bracket 106. Vertical plate 1000 also includes an opening 1046 (FIG. 13) that accepts a top of fastener 118 used to fasten beam bracket 106 to a beam thereby preventing fastener 118 from interfering with the mounting of large camera bracket 204 to beam bracket 106.

Horizontal plate 1002 is adapted to support a large camera. Horizontal plate 1002 includes a material reduction opening 1050, an electronics access area 1052 and camera mounting holes 1054, 1056 and 1058. Material reduction opening 1050 reduces the amount of material needed to form horizontal plate 1002 thereby reducing the cost and weight of large camera mount 1004. Electronics access area 1052 provides access to an electronics port on a large camera mounted to large camera bracket 204. Mounting holes 1054, 1056 and 1058 accept fasteners used to mount a large camera to large camera bracket 204 where the large camera is larger than the small camera mounted to small camera bracket 104.

Figure 14:
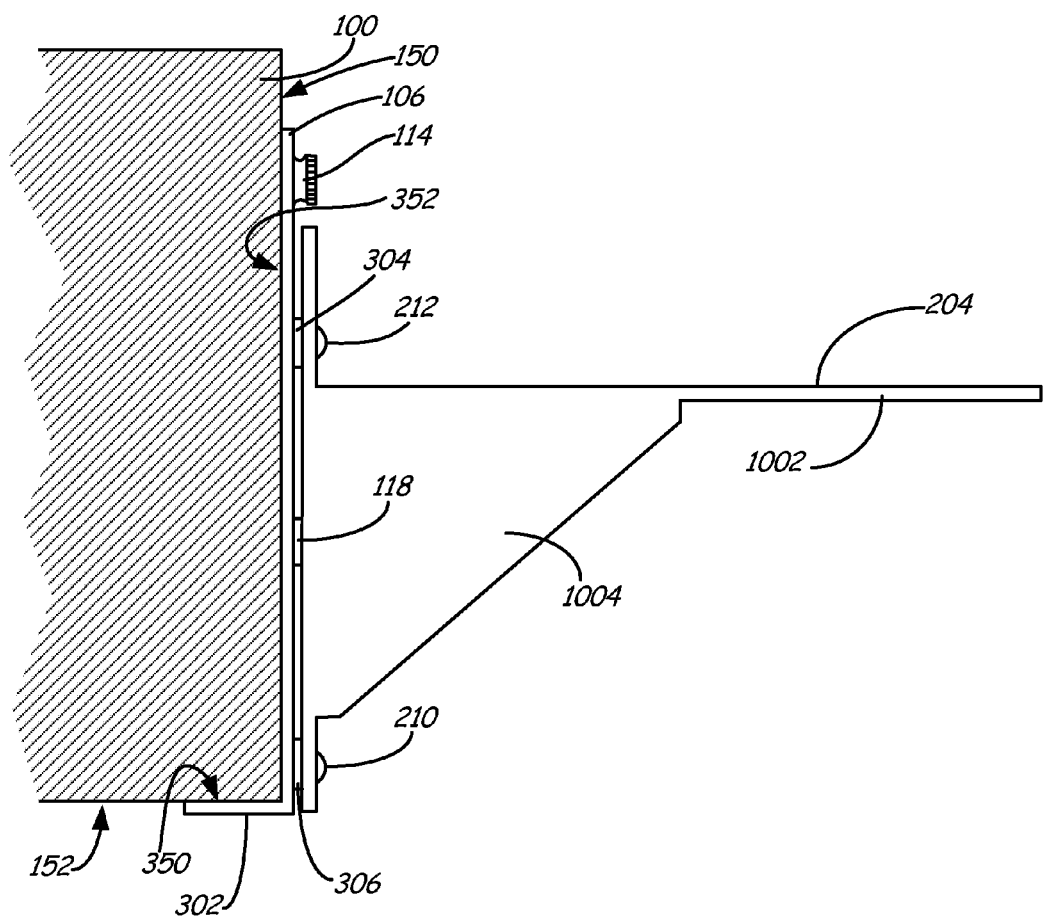
FIG. 14 is a side view of a beam mount and large camera mount mounted to a structural beam.
Figure 15:
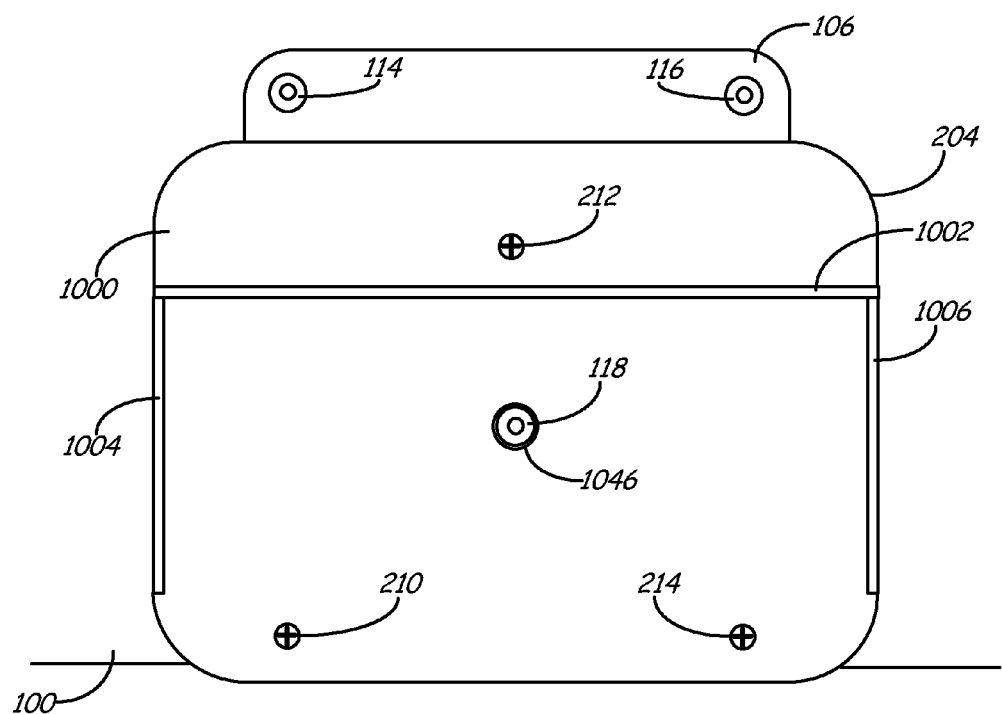
FIG. 15 is a front view of the beam mount and large camera mount of FIG. 14.

FIGS. 14 and 15 show a side view and a front view, respectively of a large camera bracket 204 mounted to a beam bracket 106, which is mounted to a building structure 100. Large camera bracket 204 is mounted to beam bracket 106 by three fasteners 210, 212 and 214 and beam bracket 106 is mounted to building structure 100 by three fasteners 114, 116 and 118. As shown in FIG. 15, large camera bracket 204 includes opening 1046 that allows fastener 118 to protrude through large camera bracket 204 such that fastener 118 does not interfere with the mounting of large camera bracket 204 on beam bracket 106. In one embodiment, fasteners 210, 212 and 214, are screws that screw into mounting holes 310, 312 and 314 of beam bracket 106. In some embodiments, fasteners 114, 116 and 118 are concrete fasteners such as concrete anchor bolts, masonry screws, and powder or ballistic fasteners.

Note that large camera bracket 204 may be removed from beam bracket 106 without removing beam bracket 106 from building structure 100. As a result, a small camera mount may be exchanged for large camera bracket 204 thus replacing a large camera with a small camera without damaging building structure 100. In other words, the camera mount attached to beam bracket 106 may be changed such that a different sized camera may be mounted on building structure 100 without having to remove fasteners 114, 116 and 118 and without having to install new fasteners into building structure 100. This keeps building structure 100 from being damaged when changing the camera that is mounted to building structure 100.

When beam bracket 106 is mounted to building structure 100, a top surface 350 of horizontal section 302 of beam bracket 106 is mounted flush to a bottom surface 152 of building structure 100. Similarly, a back surface 352 of vertical section 300 of beam bracket 106 is mounted flush to vertical surface 150 of building structure 100. Horizontal mounting plate 1002 extends normal to back surface 352 such that a large camera may be mounted beneath horizontal mounting plate 1002. By mounting beam bracket 106 with surface 350 flush to surface 152, the large camera mounted to large camera bracket 204 is positioned at a desired height relative to building structure 100. In particular, the large camera is mounted as high as possible without having its view obstructed by building structure 100.

Figure 16:
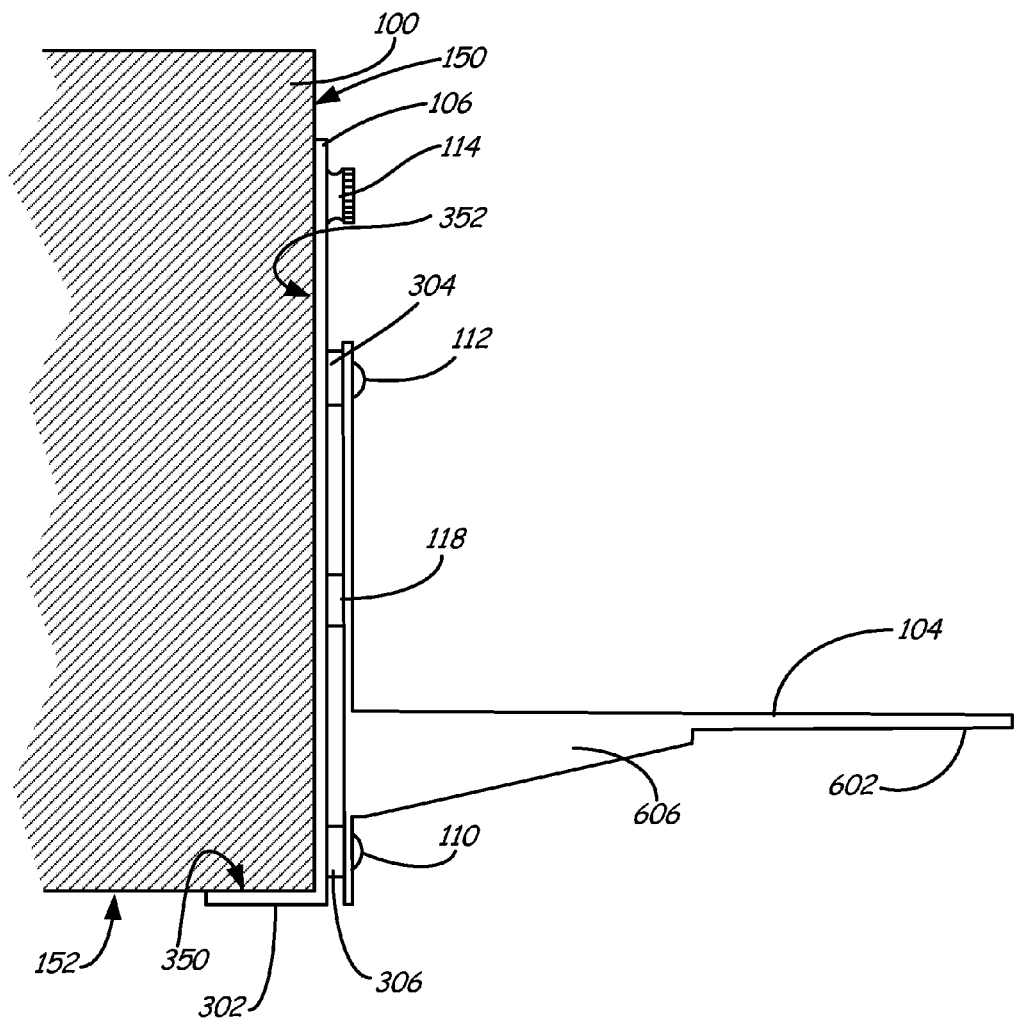
FIG. 16 is a side view of a beam mount and small camera mount mounted to a beam.
Figure 17:
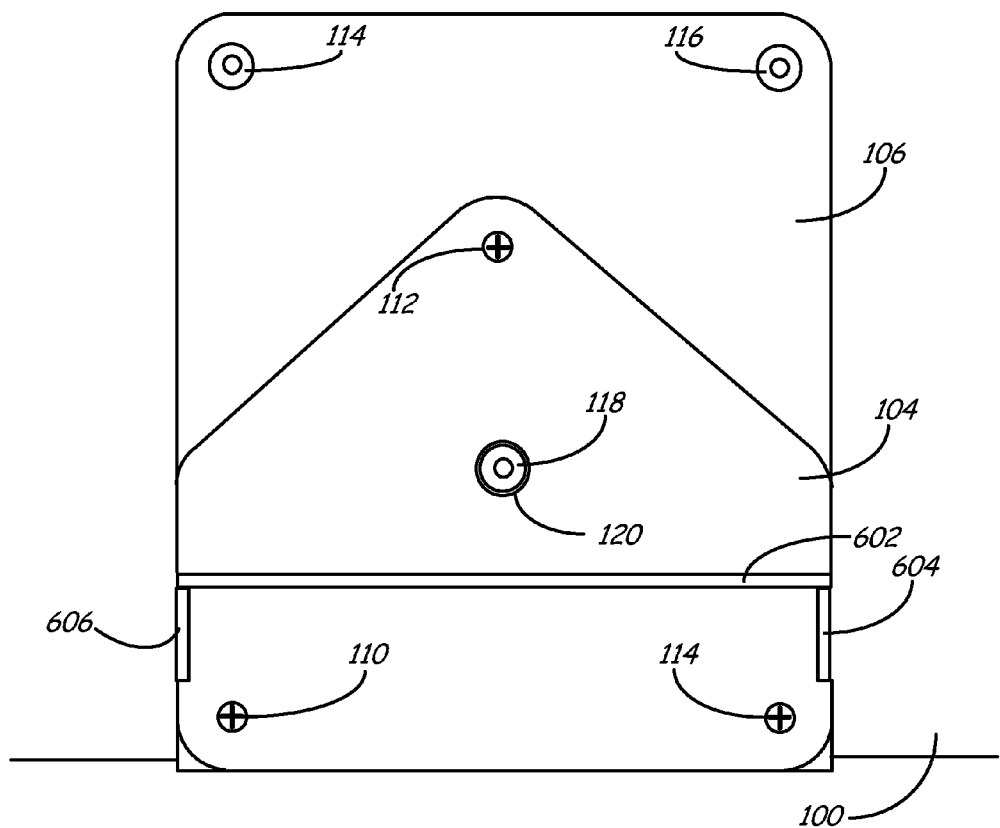
FIG. 17 is a front view of the beam mount and small camera mount of FIG. 16.

FIG. 16 provides a side view and FIG. 17 provides a front view, respectively, of small camera bracket 104 mounted to beam bracket 106, which is mounted to building structure 100. Small camera bracket 104 is mounted to beam bracket 106 by three fasteners 110, 112 and 114 and beam bracket 106 is mounted to building structure 100 by three fasteners 114, 116 and 118. As shown in FIG. 17, small camera bracket 104 includes opening 120 which allows fastener 118 to protrude through small camera bracket 104 such that fastener 118 does not interfere with the mounting of small camera bracket 104 on beam bracket 106. In one embodiment, fasteners 110, 112 and 114 are screws that screw into mounting holes 310, 312 and 314 of beam bracket 106. In some embodiments, fasteners 114, 116 and 118 are concrete fasteners such as concrete anchor bolts, masonry screws, and powder or ballistic fasteners.

Note that small camera bracket 104 may be removed from the bracket 106 without removing beam bracket 106 from building structure 100. As a result, a large camera mount may be exchanged for small camera bracket 104 thereby replacing a small camera with a large camera without damaging building structure 100. In other words, small camera bracket 104 may be exchanged for a large camera mount such that a different sized camera may be mounted on building structure 100 without having to remove fasteners 114, 116 and 118 and without having to install new fasteners into building structure 100. This reduces the amount of damages to building structure 100 when changing the camera mounted to building structure 100.

When beam bracket 106 is mounted to building structure 100, a top surface 350 of horizontal section 302 of beam bracket 106 is mounted flush to a bottom surface 152 of building structure 100. Similarly, a back surface 352 of vertical section 300 of beam bracket 106 is mounted flush to vertical surface 150 of building structure 100. Horizontal mounting plate 602 extends normal to back surface 352 such that a small camera may be mounted beneath horizontal mounting plate 602. By mounting beam bracket 106 with surface 350 flush to surface 152 of building structure 100, the small camera mounted to small camera bracket 104 is positioned at a desired height relative to building structure 100. In particular, the small camera is mounted as high as possible without having its view obstructed by building structure 100.

Figure 18:
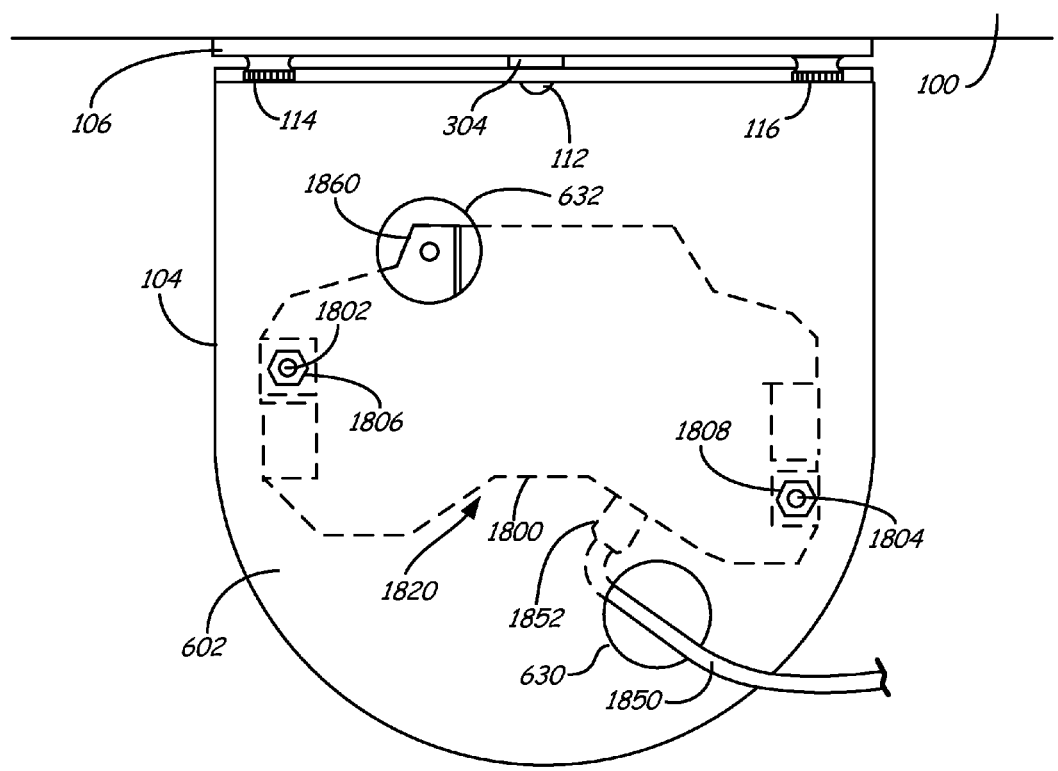
FIG. 18 is a top view of a beam mount and small camera mount mounted to a beam with a camera oriented in a first position.
Figure 19:
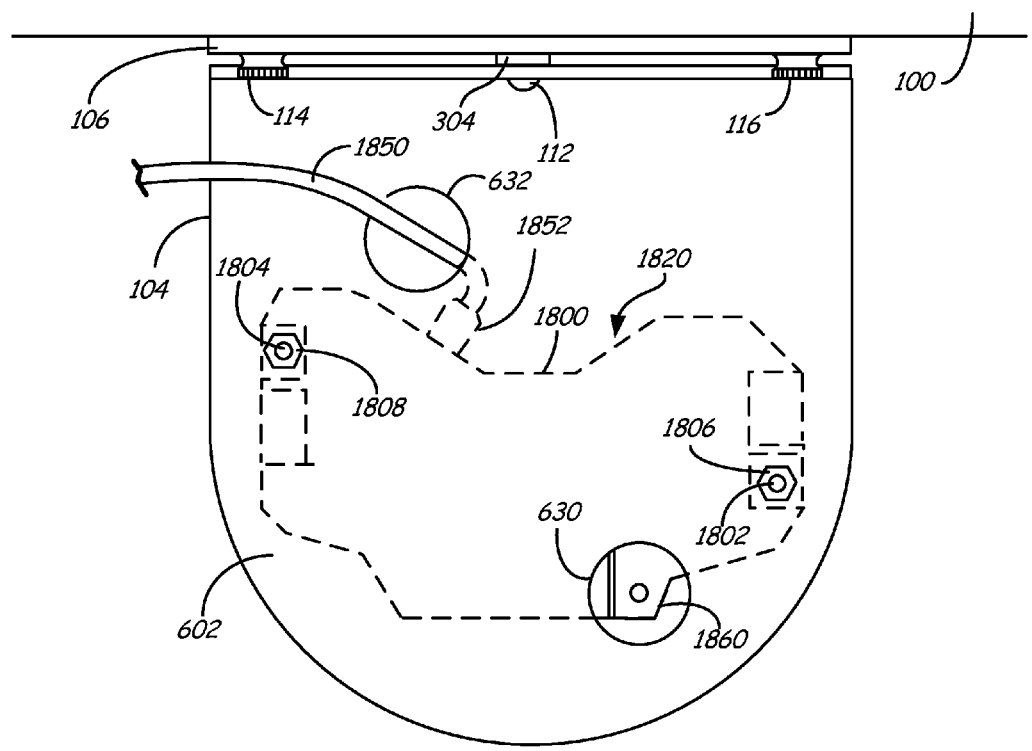
FIG. 19 is a top view of a beam mount and a small camera mount mounted to a beam with a camera oriented in a second position.

FIGS. 18 and 19 show a top view of small camera bracket 104 mounted to beam bracket 106, which is mounted to building structure 100. In FIG. 18, an internal camera structure 1800 is mounted to horizontal plate 602 through bolts 1802 and 1804 and respective nuts 1806 and 1808, where bolts 1802 and 1804 pass through opening 634 and 636 in horizontal plate 602. In FIG. 19, internal camera structure 1800 is mounted in a second orientation to horizontal plate 602 using bolts 1802 and 1804 and respective nuts 1806 and 1808. In FIGS. 18 and 19, the portions of the internal camera structure 1800 that are covered by horizontal plate 602 are shown in dotted lines.

The orientation of internal camera structure 1800 in FIG. 19 is 180° different from the orientation of internal camera structure 1800 in FIG. 18. Thus, in FIG. 18, an electronics connection area 1820 of internal camera structure 1800 points away from building structure 100 and in FIG. 19, electronics connection area 1820 points toward building structure 100.

In FIG. 18, an electronics cable 1850, which ends in a plug 1852, passes through access opening 630 so that plug 1852 can be inserted into a port in electronics connection area 1820 of camera structure 1800. In FIG. 19, electronics cable 1850 passes through access opening 632 so that plug 1852 may be inserted into the port in electronics connection area 1820. In FIG. 18, portion 1860 of internal camera structure 1800 blocks opening 632 such that plug 1852 cannot be easily passed through opening 632 and such that it would be difficult to maneuver plug 1852 to the port in electronics connection area 1820 if the electronics cable 1850 were inserted through opening 632. Similarly, in FIG. 19, portion 1860 would make it difficult to connect plug 1852 to the port in electronics connection area 1820. By providing two access openings 630 and 632 that are offset from each other, embodiments allow the internal camera structure to be mounted in one of two orientations to horizontal plate 602 while still permitting an easy connection of electronics cable 1850 to the camera.

While only a single electronics cable 1850 is shown in FIGS. 18 and 19, those skilled in the art will recognize that multiple cables could be passed through access openings 630 and 632 and may be connected to multiple ports in connections area 1820 of camera structure 1800. In the examples of FIGS. 18 and 19, cable 1850 is a network cable that provides power and control signals to the camera to control the orientation, zoom and focus of the camera, and that conveys video and, in some embodiments, audio feeds from the camera to a server or client device on a network.

A method of mounting a camera to a building structure under some embodiments includes mounting beam bracket 106 to the building structure such that a bottom ledge 302 of the beam mount is in contact with a bottom 152 of the building structure and a mounting surface 352 of beam bracket 106 is in contact with a side surface 150 of the building structure. A selection is made between a small camera bracket 104 and a large camera bracket 204 based on a camera to be mounted to the building structure. Small camera bracket 104 has mounting openings 640, 642 and 644 and large camera bracket 204 has mounting openings 1040, 1042, and 1044 that have a same spatial distribution as mounting openings 310, 312 and 314 of beam bracket 106. The selected camera mount, either small camera bracket 104 or large camera bracket 204, is mounted to beam bracket 106 by passing fasteners, such as fasteners 110, 112, and 114 or fasteners 210, 212 and 214, through the mounting openings of the selected camera mount and the mounting openings 310, 312 and 314 of beam bracket 106. If small camera bracket 104 is mounted to beam bracket 106, a small camera 102 is mounted to small camera bracket 104. If large camera bracket 204 is mounted to beam bracket 106, a large camera 202 is mounted to large camera bracket 204. In either case, the cameras are mounted to the camera mounts such that the view of the camera is not blocked by the building structure.

After a camera has been mounted to the building structure, it is possible to replace the camera with a different sized camera without removing beam bracket 106. For example, if a small camera 102 is mounted to small camera bracket 104, which is mounted to beam bracket 106, small camera bracket 104 may be removed from beam bracket 106 while leaving beam bracket 106 mounted to the building structure. A large camera bracket 204 may then be installed on beam bracket 106 and a large camera 202 may be mounted to large camera bracket 204. Alternatively, if a large camera 202 is mounted to large camera bracket 204, which is mounted to beam bracket 106, large camera bracket 204 may be removed from beam bracket 106 while leaving beam bracket 106 mounted to the building structure. A small camera bracket 104 may then be installed on beam bracket 106 and a small camera 102 may be mounted to small camera bracket 104.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A system comprising:
   a beam bracket, adapted to be mounted to a building structure and comprising mounting holes distributed in a spatial configuration;
   a small camera bracket, comprising mounting holes distributed in the same spatial configuration as the mounting holes of the beam bracket with the mounting holes of the small camera bracket adapted to be aligned with the mounting holes of the beam bracket, the small camera bracket further comprising a plate adapted support a small camera; and
   a large camera bracket, comprising mounting holes distributed in the same spatial configuration as the mounting holes of the beam bracket with the mounting holes of the large camera bracket adapted to be aligned with the mounting holes of the beam bracket, the large camera bracket further comprising a plate adapted to support a large camera that is larger than the small camera, wherein the small camera bracket and the large camera bracket are selectively attachable to the beam bracket.

2. The system of claim 1 wherein the beam bracket and the small camera bracket ensure that a camera lens of the small camera is positioned below the bottom of the building structure.

3. The system of claim 1 wherein the beam bracket and the large camera bracket ensure that a camera lens of the large camera is positioned below the bottom of the building structure.

4. The system of claim 1 wherein the spatial configuration of the mounting holes prevents the small camera bracket from being mounted upside down on the beam bracket.

5. The system of claim 4 wherein the spatial configuration of mounting holes prevents the large camera bracket from being mounted upside down on the beam bracket.

6. The system of claim 1 wherein the small camera bracket further comprises at least two electronics openings such that the small camera is adapted to be mounted in two different orientations on the small camera bracket while still providing access through at least one of the two electronics openings to an electronics connection area on the camera.

7. The system of claim 1 wherein the beam bracket further comprises an extending element that is adapted to be mounted against an open-ended bottom surface of the building structure.

8. A camera mounting apparatus comprising:
   a beam mount comprising an upward facing top surface adapted to be mounted flush against a downward facing bottom surface of a structural beam, a back surface adapted to be mounted flush against a side of the structural beam and a plurality of mounting holes; and
   a camera mount comprising a plurality of mounting holes such that there is only one orientation of the camera mount relative to the beam mount that will align the plurality of mounting holes of the camera mount with the plurality of mounting holes of the beam mount, the camera mount further comprising camera mounting holes adapted to allow a camera to be mounted to the camera mount, wherein when a downward facing camera is mounted to the camera mount, and the camera mount is mounted to the beam mount, and the beam mount is mounted to the structural beam, the view of the downward facing camera is not blocked by the structural beam.

9. The apparatus of claim 8 wherein the camera mount further comprises at least two access holes, the two access holes positioned such that a connection area on the camera may be accessed through one of the access holes when the camera is mounted in one orientation on the camera mount and such that the connection area on the camera may be accessed through another of the access holes when the camera is mounted in a different orientation on the camera mount.

10. The apparatus of claim 8 wherein the camera mount is a small camera mount adapted to have a small camera mounted to it and wherein the beam mount is adapted to have a large camera mount mounted to the beam mount in place of the small camera mount, the large camera mount comprising camera mounting holes adapted to allow a large camera that is larger than the small camera to be mounted to the large camera mount.

11. The apparatus of claim 10 wherein when the small camera is mounted to the small camera mount, and the small camera mount is mounted to the beam mount and the beam mount is mounted to the structural beam, the view of the small camera is not blocked by the structural beam and when the large camera is mounted to the large camera mount, and the large camera mount is mounted to the beam mount and the beam mount is mounted to the structural beam, the view of the large camera is not blocked by the structural beam.

12. The apparatus of claim 8 wherein the camera mount comprises a horizontal plate extending normal to the back surface of the beam mount such that the camera is positioned below the horizontal plate.

13. The apparatus of claim 12 wherein the beam mount further comprises spacers located around the mounting holes and being adapted to separate a front surface of the beam mount from the camera mount.

14. A method comprising:
mounting a beam bracket to a building structure such that a bottom ledge of the beam bracket is in contact with an open-ended bottom surface of the building structure and a mounting surface of the beam bracket is in contact with a side surface of the building structure, the beam bracket comprising mounting openings that have a spatial distribution;

selecting between a small camera mount and a large camera mount based on a camera to be mounted to the building structure, the small camera mount and the large camera mount both having mounting openings that have the same spatial distribution as the mounting openings of the beam bracket;

mounting the selected camera mount to the beam bracket by passing fasteners through the mounting openings of the selected camera mount and the mounting openings of the beam bracket; and mounting the camera to the selected camera mount.

15. The method of claim 14 wherein the spatial distribution of the mounting holes on the beam bracket prevent the selected camera mount from being mounted in an incorrect orientation on the beam bracket.

16. The method of claim 14 wherein mounting the camera to the selected camera mount positions the camera so that the view of the camera is not blocked by the building structure.

17. The method of claim 14 wherein the camera may be mounted to the camera mount in two different orientations.

18. The method of claim 17 wherein the camera mount comprises two access holes such that an electrical connection area on the camera may be accessed through one of the two access holes in the selected camera mount when the camera is mounted in one orientation and the electrical connection area on the camera may be accessed through another of the two access holes in the selected camera mount when the camera is mounted in a different orientation.

19. The method of claim 14 further comprising removing the selected camera mount from the beam bracket, selecting a different camera mount, and mounting the different camera mount to the beam bracket.

* * * * *